E. A. SPERRY.
ROTOR FOR GYROSCOPES.
APPLICATION FILED APR. 20, 1917.

1,426,336.

Patented Aug. 15, 1922.
2 SHEETS—SHEET 1.

INVENTOR
ELMER A. SPERRY
BY
Herbert H. Thompson
ATTORNEY.

E. A. SPERRY.
ROTOR FOR GYROSCOPES.
APPLICATION FILED APR. 20, 1917.
1,426,336.
Patented Aug. 15, 1922.
2 SHEETS—SHEET 2.
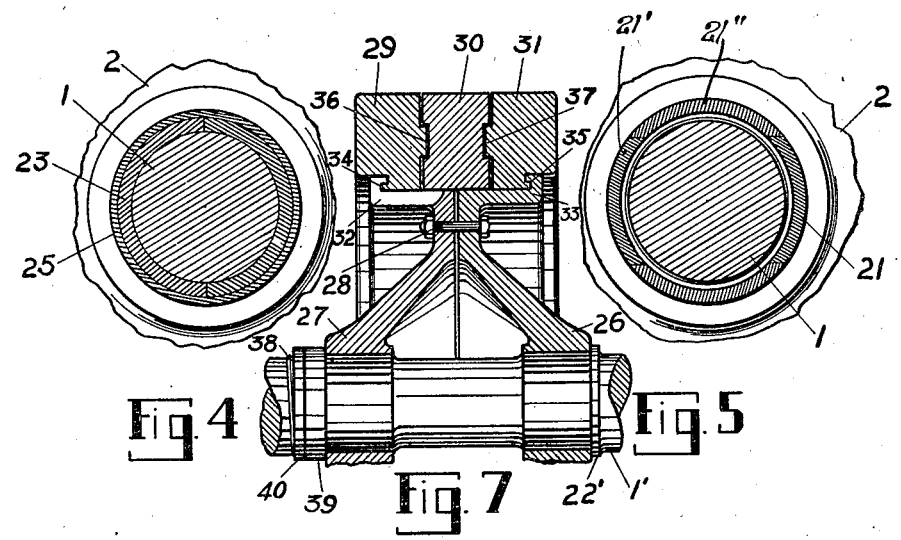
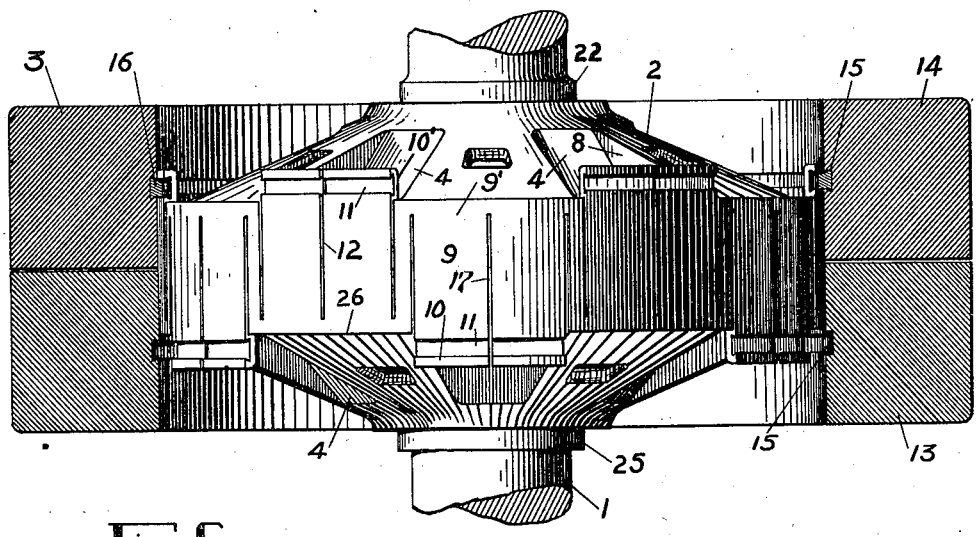
INVENTOR
ELMER A. SPERRY
BY
Herbert H. Thompson
ATTORNEY.

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

ROTOR FOR GYROSCOPES.

1,426,336.  Specification of Letters Patent.  Patented Aug. 15, 1922.

Application filed April 20, 1917. Serial No. 163,342.

*To all whom it may concern:*

Be it known that I, ELMER A. SPERRY, a citizen of the United States of America, residing at 1505 Albermarle Road, Brooklyn, in the county of Kings and State of New York, have invented certain new and useful Improvements in Rotors for Gyroscopes, of which the following is a specification.

This invention relates to fly wheels for use as rotors of gyroscopes, especially gyroscopes of large size such as employed for stabilizers for ships, and to the method of constructing the same. Owing to the enormous weight of the rotor it is impracticable to cast it in one piece, or even to cast the rim alone in one piece, and owing to the magnitude and varied character of the stresses to which a stabilizing rotor is subject, it is impracticable to assemble the several parts in any of the ways in which built up fly wheels are assembled. The problem of constructing a gyroscopic rotor is also very different from the ordinary fly wheels, since very much higher speeds are employed. The object of the invention is to provide a wheel which is both strong and simple in construction.

This application has certain features in common with my copending application for rotors for gyroscopic stabilizers, Serial No. 136,617, filed December 13, 1916, and to that extent is a continuation thereof.

Referring to the drawings in which what I now consider to be the preferred forms of my invention are shown:

Fig. 4 is a cross section taken on line 4—4, Fig. 2, of the rings which hold the rotor in place on the shaft.

Fig. 5 is a cross section of a hub spacer, taken on line 5—5, Fig. 2.

Fig. 6 is a top view of the wheel with the rim cut away on section line 6—6, Fig. 1, and Fig. 7 is a modification of the invention.

Figures 2, 3:
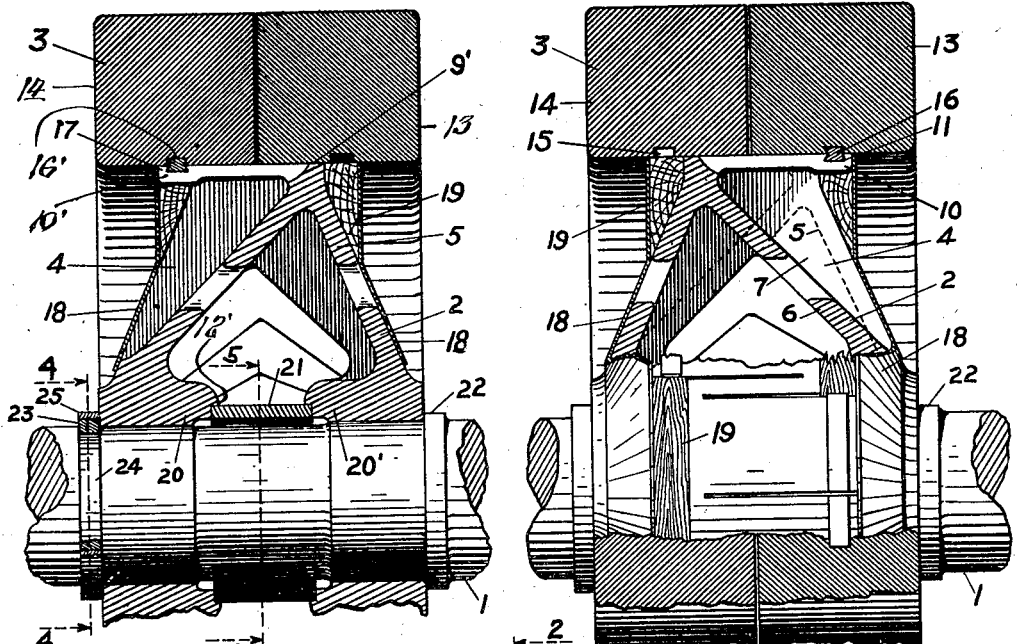
Fig. 2 is a cross section thereof, taken on line 2—2, Fig. 1.
Fig. 3 is another cross section taken on line 3—3, Fig. 1.
Figure 1:
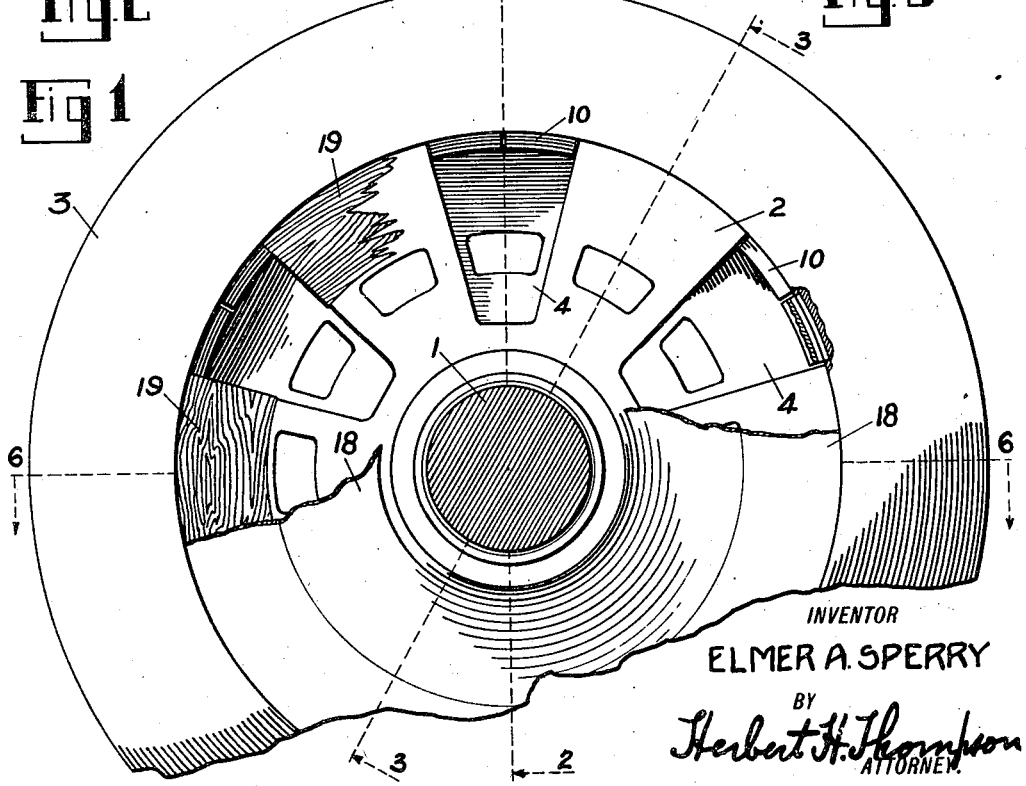
Fig. 1 is an elevation, partly in section, of an assembly of the rotor.

In the drawings, 1 is the axle upon which the wheel is mounted. The hub member or spider is shown at 2, and the rim at 3. The hub is preferably cast in one piece with spaced recesses 4 in each side. The recesses on either side are located diagonally opposite one another, and the inside of the hub is hollow, so that cross sectional views taken through oppositely disposed recessed sections in effect present the appearance of skeleton spokes oppositely inclined, as shown in Figs. 2 and 3, in which the side 5 in Fig. 2 is represented by dotted lines in Fig. 3. There is no severence, however, between the sides 5 and 6; the space 7 constituting the offset between having a connecting wall as shown at 8 in Fig. 6, which is an integral part of the casting.

The hub portion proper has connected thereto, or at intervals therewith, arms or members which are preferably more readily yieldable radially than axially for the purpose hereinafter described. More specifically, the periphery 9 of the hub is provided with projecting portions 10, occurring, it will be noted over each recess, and having a keyway 11 therein. The periphery is provided with numerous slits 12 and 17 as shown in Fig. 6, separating the projections 10 from the hub except at their inner ends. Groups of slits 12 and 17 preferably extend alternately from opposite directions so that a plurality of oppositely extending projections or members 10 and 10' are formed, the members 10 being secured adjacent their upper ends, for instance, in Fig. 6 and free adjacent their lower ends, while the members 10' are secured to the hub adjacent their lower ends and free to move radially at their upper ends. The rim of the wheel is preferably cast in a plurality of parts 13 and 14, each forming a solid ring. The rim as a whole is secured to the hub or web only through the yielding members 10 and 10'. More specifically each part 13 and 14 is connected to that portion of the arms 10 and 10' thereunder which is free or in other words disconnected from the hub. Thus as shown in Fig. 3 the ring 13 is secured by means of dove-tail key 16 to the arms 10 while the ring 14 (Figs. 2 and 6) is secured by similar keys 16' to the upper free ends of arms 10'. Said keys fit in corresponding keyways 15 into the rim and keyways 11 in the free ends of each of arms 10 and 10'. It will be readily seen that by securing the rims by such or similar means to the arms the rims are prevented from moving axially on the hub due to the constant change in position by the revolution of the gyroscopic rotors and stresses incident thereto. The arms 10 it will be evident possess much greater stiffness to axial compression strains than to bending strains about their point of connection with the hub as a pivot.

It is well known that when a fly wheel rotates at a high speed, the enormous centrifugal force causes the rim to expand and become loose upon the hub or to pull the hub loose from the shaft. By providing the recesses 4 in the sides of the hub and then slitting the periphery, I provide a plurality of yielding or resilient portions or arms 10 and 10', since each is unsupported at one end. By locking the rim to the unsupported ends of these arms with the dovetailed keys 16, any enlargement of the rim will draw the arms with it, thus preventing a separation of the rim from the hub. The proportion of these arms to the rest of the hub is such that the arms will yield without any danger of pulling the hub loose from the shaft.

In my construction I am also able to secure certain of the advantages obtained by the use of flexible shafts for fly wheels. The heavy rim of my fly wheel which comprises, of course, by far the larger part of the moment of inertia of the wheel, does not have to be accurately balanced but may be slightly out of balance and still operate satisfactorily since after it passes the critical speed it will rotate about its true center of inertia as in the case of a fly wheel with a flexible shaft.

In addition I may construct the periphery of the hub slightly higher at its yielding edges 10 than at the opposite sections 9", and then shrink the rim on or compress the periphery and slide the rim on cold. This would cause the periphery to inherently follow the enlargement of the rim.

The recessing of the sides of the hub not only renders it possible to provide yielding arms 10 and 10', but, as will appear from a brief examination of the drawings, serves also to form an exceedingly rigid and well braced hub, capable of withstanding severe lateral strains.

In order to minimize atmospheric friction on the surface of the rotor, I desire to cover the sides of the hub with plates 18. The plates may be so shaped as to include the protruding ends of arms 10 and 10'. A filler 19, of wood or other suitable substance, may be used in some of the spaces between the plates 18 and the hub, to insure the rigidness of the plates and thus avoid the possibility of any vibration thereof.

In order to reduce as much as possible strains due to cooling and contraction of the hub after casting, I prefer to leave a space between the annular portions 20 and 20', and to insert between these portions, a spacer 21. The said spacer also prevents centrifugal force from drawing the portions inwardly and creating a space between the hub and the shoulders on the shaft. The spacer or wedge 21 is made up in sections 21' and 21" as shown in Fig. 5, so as to make possible the insertion thereof. Shoulders 12' on interior edges of portions 20 and 21' serve to prevent displacement of the sectional spacer or wedge 21.

The hub is secured against lateral movement on the shaft, by shoulder 22 on one side, and a split ring 23 fitting into a groove 24 around the shaft on the other side. A closed ring 25 may be shrunk on over the split ring to hold the latter in place.

In Fig. 7 I show a modification in the form of my invention. The hub is shown as comprising two parts 26 and 27 secured together by bolts 28. The rim may comprise any desired number of rings. As an illustration, three rings 29, 30 and 31 are shown, locked to the flaring portions 32 and 33 of the periphery of the hub, at 34 and 35, and interlocked at 36 and 37. The hub portions are placed upon the shaft 1' resting against shoulder 22'. Threads 38 are provided on the shaft, and nut 39 and lock nut 40 screwed on with sufficient force to impart an initial strain to the sides of the hub, causing the hub to press tightly against the rim. When the rim spreads under centrifugal force it draws the flaring portions 32 and 33 with it. This causes a dishing of the hub and presses the parts of the rim more firmly together.

As shown at 32 the periphery of the hub may be provided with slits similar to slits 12 in Fig. 6, for the purpose of adding greater elasticity to the hub.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A fly wheel comprising a hub portion having a resilient yielding periphery and a rim connected to said periphery whereby expansion of the rim will cause the periphery to follow.

2. A rotor for gyroscopes including a hub member having portions of its periphery radially yieldable with respect to the body thereof, a rim, and means for securing said rim to the hub member through said yielding portions.

3. A rotor for gyroscopes including a hub member having a web portion, axially extending arms secured at one end near the periphery of said web portion, and a rim secured to said arms adjacent their free ends.

4. A rotor for gyroscopes including a hub member having portions of its periphery on each side thereof radially yieldable with respect to the body thereof, a plurality of rims mounted side by side on said member and means for securing each rim to said member by connecting it to the yielding portions thereof.

5. A rotor for gyroscopes including a hub member, a plurality of axially extending members secured thereto and extending therefrom in both directions and a rim secured to the members adjacent their free ends.

6. In a fly wheel, a hollow hub member having a plurality of axle engaging portions, means for spacing said annular portions, the periphery of said hub comprising a plurality of yielding parts, a rim mounted on said hub and means for locking said rim to said yielding parts.

7. A fly wheel comprising a hollow hub portion having serrations in the sides thereof, whereby sections of the periphery of the hub are unattached at one edge to the main part of the hub, said periphery having slits therein whereby the unattached edges thereof are rendered yieldable, a rim mounted on said hub and means for locking the rim to said unattached edges of the periphery.

8. A fly wheel comprising a hollow hub portion having serrations in the sides thereof, whereby sections of the periphery of the hub are unattached at one edge to the main part of the hub, said periphery having slits therein, whereby the unattached portions thereof are rendered yieldable, the yieldable parts being made slightly higher radially than the rest of the periphery, a rim mounted on said hub, compressing said yieldable parts, and means for preventing relative lateral movement between said hub and said rim.

9. A fly wheel comprising a hollow hub portion having spaced indentations arranged in staggered relation around the sides thereof, whereby sections of the periphery of the hub portion are unattached to the hub proper on one edge, said periphery having slits cut part way thereacross, a rim mounted on said hub and locking means for preventing relative lateral movement between said hub and said rim, and for causing said unattached edges of said periphery to follow any enlargement of the rim.

10. A fly wheel including a hub member having portions of its periphery on each side thereof radially yieldable with respect to the body thereof, a rim mounted on said hub and means for securing said rim to said hub by connecting it to the yielding portions thereof.

11. In a gyroscopic rotor the combination with a rim and an axle, of a hub mounted on said axle having a resilient periphery interlocking with said rim and capable of yielding through said resilient periphery to the expansion of the rim due to centrifugal force so as not to allow said hub to be pulled loose from said axle.

12. A fly wheel comprising a hub portion having serrations in the sides thereof, whereby sections of the periphery of the hub are unattached at one edge to the main part of the hub, said periphery having slits therein for rendering the unattached edges yieldable, a rim mounted on said hub and means for locking the rim to said unattached edges of the periphery.

13. A fly wheel comprising a hub portion having serrations in the sides thereof, whereby sections of the periphery of the hub are unattached at one edge to the main part of the hub, said periphery having slits therein whereby the unattached edges thereof are rendered yieldable, a keyway in the yieldable portions of said periphery, a corresponding keyway in said rim and a key in said keyways.

14. A rotor for gyroscopes including a conical-shaped web portion secured to a shaft by spaced hub portions and a wedge inserted between said hub portions adjacent the shaft to maintain their spaced relation.

15. A rotor for gyroscopes including a plurality of spaced hub portions, a conical web portion connecting the same, and a sectional annular spacing member inserted between said spaced hubs.

16. A rotor for gyroscopes including a plurality of spaced hub portions, a conical web portion connecting the same, a seat on the periphery of the web for the rim, a plurality of segmental members forced between the hubs, and a shoulder on a hub adapted to prevent the throwing outwardly of the members.

17. A rotor for gyroscopes including a plurality of spaced hub portions, a conical web portion connecting the same, an annular spacing member inserted between said spaced hubs, and abutments on the shaft against which the wedge forces the hubs.

18. A fly wheel comprising a hub and web portion having a flat periphery, a rim supported on said periphery and means including a radially yieldable member or members connecting said web and rim sections whereby the expansion of the rim under centrifugal strains is absorbed by said member or members so as not to stress or loosen the hub on the shaft.

19. A fly wheel comprising a web portion having a flattened periphery, an annular rim supported on said periphery and an axially extending resilient member connected adjacent one end to said web and adjacent the other end to said rim.

20. A fly wheel comprising a hub and web portion having a plurality of radially yieldable arms formed integrally therewith and a rim anchored to the free ends of said arms, encircling and enclosing said hub and web.

21. A fly wheel comprising a web portion having a plurality of radially yieldable arms formed integrally therewith extending alternately in opposite directions, and a rim anchored to the free ends of said arms.

22. A fly wheel comprising a web portion having a plurality of radially yieldable arms formed integrally therewith extending alternately in opposite directions, and a rim secured to the free ends of each group of arms.

23. A fly wheel comprising a hub portion, a separate rim, a member connected adjacent one extremity to said hub and adjacent the other extremity to said rim, a second member connected to said hub and rim adjacent opposite extremities to said first member, said members serving as radially yieldable couplings but resisting relative axial movement between said hub and rim.

24. A rotor for gyroscopes including a hub member having portions of its periphery on each side thereof radially yieldable with respect to the body thereof, a rim comprising a plurality of rings mounted on said member and means securing said rim to said yielding portions.

25. In a fly wheel, an axle-engaging member, a radial extension thereon forming a web, a rim supported on said web, and yielding means connecting said rim to said extension.

26. A fly wheel comprising a web portion having a flattened periphery, an annular rim supported on said periphery, and an axially extending resilient member connected adjacent one end to said hub and adjacent the other end to said rim, said member forming a part of said periphery.

27. In a fly-wheel, the combination of a member adapted to be mounted on a driving shaft, a rim member which is self-supporting, and means for uniting the members which is relatively more yieldable radially than circumferentially or in planes at an angle to the fly wheel, thereby transmitting torque from one member to the other without transmitting a large proportion of the centrifugal strain.

28. A fly-wheel comprising a hub section, a separate ring section placed thereon under tension, and means including a radially yieldable member or members connecting said hub member and section.

29. A fly-wheel comprising a hub section having a main portion thereof comparatively rigid and another portion thereof outwardly yieldable, and a separate ring section placed upon said rigid portion under tension and connected to said yieldable portion.

30. A fly wheel comprising a comparatively rigid hub section, an outwardly yieldable member connected with said section, and a separate rim section placed upon said rigid section under tension and connected to said yieldable member.

In testimony whereof I have affixed my signature.

ELMER A. SPERRY.